(12) United States Patent
Itou et al.

(10) Patent No.: US 6,841,281 B2
(45) Date of Patent: Jan. 11, 2005

(54) FUEL CELL SYSTEM AND MICROORGANISM INHIBITING METHOD

(75) Inventors: Yasuyuki Itou, Yokohama (JP); Toshihiro Takekawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 335 days.

(21) Appl. No.: 10/082,147

(22) Filed: Feb. 26, 2002

(65) Prior Publication Data

US 2002/0132143 A1 Sep. 19, 2002

(30) Foreign Application Priority Data

Mar. 14, 2001 (JP) .................................. P2001-071560

(51) Int. Cl.[7] .............................................. H01M 8/04
(52) U.S. Cl. .............................. 429/22; 429/2; 429/13; 429/34
(58) Field of Search .............................. 429/2, 13, 34, 429/22

(56) References Cited

U.S. PATENT DOCUMENTS 3,861,875 A    1/1975  Joslyn

FOREIGN PATENT DOCUMENTS

| JP | 50-160096 | 12/1975 |
| JP | 7-008541 A | 1/1995 |
| JP | 8-22833 A | 1/1996 |
| JP | 9-63612 | 3/1997 |
| JP | 2000-260447 A | 9/2000 |

*Primary Examiner*—John S. Maples
(74) *Attorney, Agent, or Firm*—Foley & Lardner LLP (57) ABSTRACT

A fuel cell system is provided with a fuel cell, a fuel gas supply line supplying fuel gas to the fuel cell, an oxidizing gas supply line supplying oxidizing gas to the fuel cell, a circulation line circulating fluid through at least one of the fuel cell, the fuel gas supply line and the oxidizing gas supply line, and a microorganism inhibiting unit located in the circulation line to execute sterilization so as to sterilize microorganisms present in the fluid. The microorganism inhibiting method is utilized in the fuel cell system of such a structure to sterilize the microorganisms present in the fluid in the midway of the circulation line.

18 Claims, 7 Drawing Sheets

FUEL CELL SYSTEM AND MICROORGANISM INHIBITING METHOD

BACKGROUND OF THE INVENTION

The present invention relates to a fuel cell system and a microorganism inhibiting method and, more particularly, to a fuel cell system and a microorganism inhibiting method both of which preclude proliferation of microorganisms present in fluid that is circulated through a fuel cell and its circulation line.

In a case where the fuel cell is employed as a power source, an attempt has heretofore been proposed to circulate coolant water for removing heat produced during production of electric power output. With a view to lowering electric conductivity, it has been a usual practice to use pure water admixed with LLC (Long Life Coolant) for preventing pure water from being iced. With such liquid, especially when pure water is admixed with LLC, this component serves as a nourishing source to cause coolant water to be proliferated with microorganisms during a circulation thereof. This results in clogging of a circulation path, causing undesirable degraded reliability in various component parts. Consequently, there is a need for implementing measures for inhibiting proliferation of the microorganisms present in coolant water. Such a situation is also similarly encountered in a use of moistening water.

Japanese Patent Application Laid-Open Publication No. H9-63612 discloses a water cooling type fuel cell system wherein a sterilizer is located in a coolant water supply unit which includes a collecting path for product water. In particular, coolant water is sterilized with ultraviolet light prior to supply of coolant water to the coolant water circulation system for thereby avoiding proliferation of the microorganisms during circulation thereof.

SUMMARY OF THE INVENTION

However, in such a fuel cell system wherein the sterilizer is located in the coolant water supply unit, once coolant water is supplied into the coolant water circulation system, the fuel cell system undergoes a difficulty in sterilizing the microorganisms present in coolant water. Accordingly, no measure has been undertaken to the microorganisms entered into the coolant water circulation system. Thus, it is desired to study for a particular measure to inhibit proliferation of the microorganisms in coolant water.

Further, such a fuel cell system adopts a structure wherein ultraviolet light is irradiated even in the absence of the microorganisms in the coolant water supply unit. This results in undesired excess electric power consumption caused by useless sterilizing steps and, therefore, there is still room for improvement in view of fuel consumption characteristic.

The present invention has been made with the above view and has an object to provide a fuel cell system and a microorganism inhibiting method both of which are effective for inhibiting proliferation of microorganisms in a circulation line in such a manner as to efficiently utilize electric power output.

To achieve such an object, the present invention provides a fuel cell system comprising: a fuel cell; a fuel gas supply line supplying fuel gas to the fuel cell; an oxidizing gas supply line supplying oxidizing gas to the fuel cell; a circulation line circulating fluid through at least one of the fuel cell, the fuel gas supply line and the oxidizing gas supply line; and a microorganism inhibiting unit located in the circulation line to execute sterilization so as to sterilize microorganisms present in the fluid.

In other words, the fuel cell system of the present invention comprises: a fuel cell; fuel gas supply means for supplying fuel gas to the fuel cell; oxidizing gas supply means for supplying oxidizing gas to the fuel cell; circulation means for circulating fluid through at least one of the fuel cell, the fuel gas supply means and the oxidizing gas supply means; and microorganism inhibiting means for executing sterilization so as to sterilize microorganisms present in the fluid in a midway of the circulation means.

On the other hand in present invention, a method of inhibiting microorganisms in a fuel cell system prepares a fuel cell and a gas supply line supplying fuel gas and oxidizing gas to the fuel cell; circulates fluid through at least one of the fuel cell and the gas supply line; and sterilize the microorganisms present in the fluid in a midway through which the fluid is circulated.

Other and further features, advantages, and benefits of the present invention will become more apparent from the following description taken in conjunction with the following drawings.

DETAILED DESCRIPTION OF THE PREFERRED EMBODIMENTS

To describe the present invention more in detail, a fuel cell system of a preferred embodiment of the present invention and a microorganism inhibiting method of the present invention will be explained with reference to the drawings below.

(First Preferred Embodiment)

Figure 1:
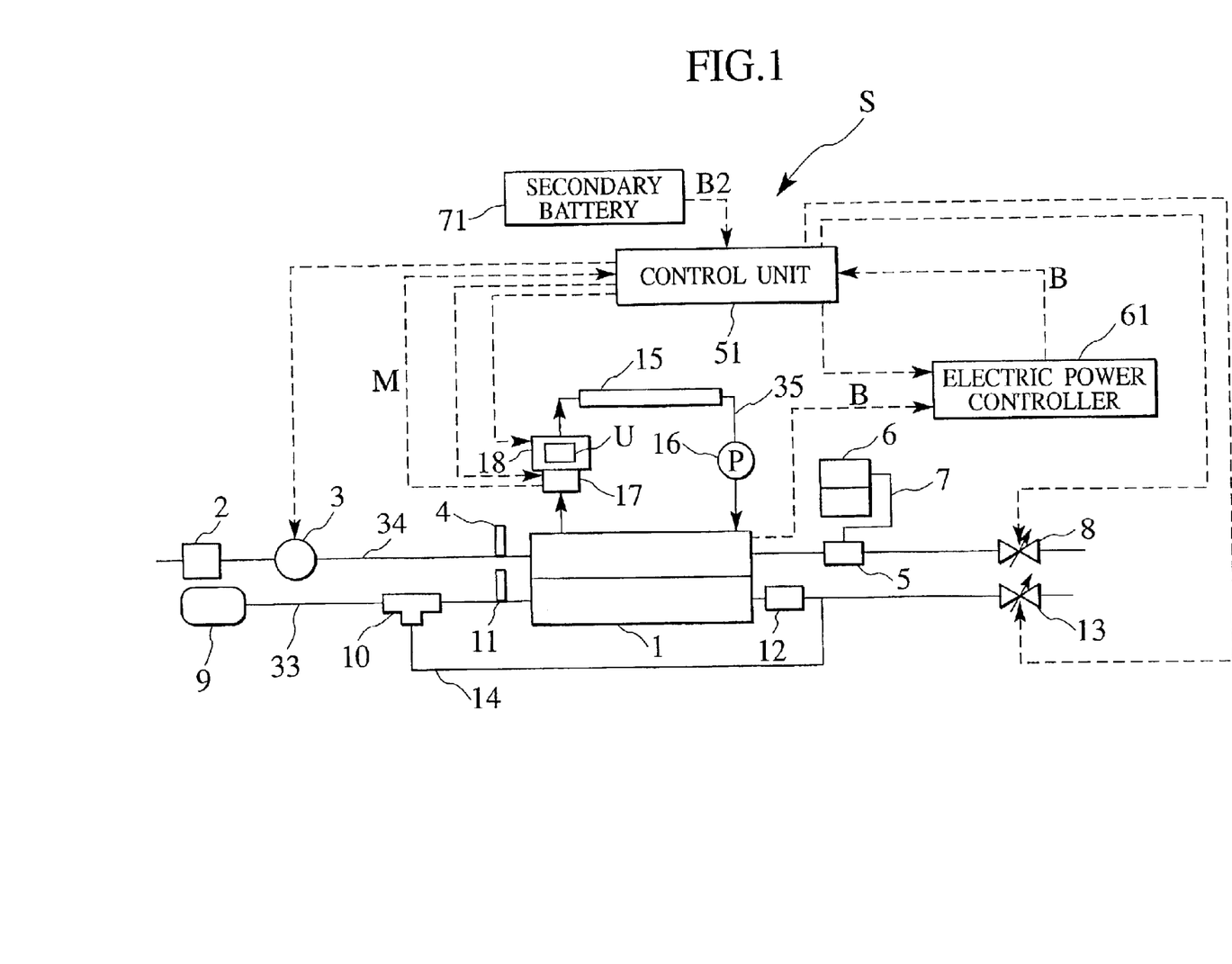
FIG. 1 is a typical structural view illustrating a first example of a fuel cell system of a first preferred embodiment according to the present invention.

FIG. 1 is a typical view illustrating a structure of a fuel cell system S, of a first preferred embodiment according to the present invention, which employs a fuel cell to produce electric power output without a reforming process. Although such a fuel cell system is herein shown as applied to a vehicle, the present invention is not limited thereto and may have other applications such as domestic use or industrial use.

In FIG. 1, the fuel cell 1 is connected to a fuel gas supply line 33 for supplying fuel gas composed of hydrogen containing gas, an air supply line (an oxidizing gas supply line) 34 for supplying air (oxidizing gas) composed of air as oxygen containing gas, and a coolant water circulation line 35, by means of respective conduits.

Located at an upstream side of the air supply line 34 is an air flow meter 2 which measures the flow rate of air to be supplied. The flow of air, which has passed through the air flow meter 2, passes into a compressor 3 located at a downstream side to pressurize air which is delivered to the fuel cell 1 under pressure.

Connected to an upstream side of the fuel gas supply line 33 is a fuel storage tank 9, whose downstream side is connected to an ejector pump 10. Connected to the ejector pump 10 is a fuel recirculation line 14 to establish a fuel recirculation path as will be described below in detail. Also, in such an example, although the ejector pump 10 has been shown as employed in the system, it may be possible for the system to employ a compressor like the air supply line 34.

Connected between the compressor 3 and the ejector pump 10, and the fuel cell 1 are pressure sensors 4 and 11, respectively, which measure input pressure levels of air and fuel gas, respectively.

Inside the fuel cell 1, oxygen is supplied to an anode side and hydrogen is supplied to a cathode side, with oxygen and hydrogen reacting with one another to perform electrochemical reaction to form water while generating electric power output which is supplied to suitable loads (not shown).

Connected at outlets of the fuel cell 1 are liquid gas separators 5 and 11 which are in communication with the air supply line 34 and the fuel gas supply line 33, respectively.

The liquid gas separator 5 separates water component which is stored in a water tank 6 via a conduit 7. A portion of exhaust gas emitting from the liquid gas separator 12 is delivered through the fuel recirculation line 14 to the ejector pump 10 for recirculation. Connected to outlets of the liquid gas separators 5 and 12 are control valves 8 and 13, respectively.

An operational state of the fuel cell 1 is controlled with and managed by a control unit 51. To this end, the fuel cell 1 is also connected to an electric power controller 61. An electric power output condition B of the fuel cell 1 is detected by the electric power controller 61, with detected electric power output condition B being monitored with the control unit 51.

The control unit 51 is responsive to the electric power output condition B of the fuel cell 1 and controls the control valves 8 and 13 for adjusting air and fuel gas at desired pressure levels, respectively. In addition to such control, the control unit 51 also controls the rotational speed of the compressor 3 for thereby adjusting the flow rate of air.

Further, a secondary battery unit 71 may be connected to the system and cooperates with the fuel cell 1. Electric power output information B2 of the secondary battery unit 71 is delivered to the control unit 51 such that charging and discharging operations of the secondary battery unit 71 are controlled. While a detailed power supply line is not herein illustrated, electric power output generated by the fuel cell 1 is delivered to the electric power controller 61 through which electric power is charged to the secondary battery unit 71 at desired timings. Furthermore, in a case where the fuel cell system S is applied to a vehicle, regenerative electric power, which is generated through a motor/generator (not shown) during a decelerating condition of the vehicle, is also supplied through the electric power controller 61 to the secondary battery unit 71 which in turn is charged.

Now, the coolant circulation line 35, which is located for recirculation of coolant, is described below in detail.

The coolant water circulation line 35 is comprised of a radiator 15 having an electric fan to be used for dissipating heat from coolant water, and a pump 16 which is able to perform stepless adjustment of the flow rate of coolant water. Also, connected in sequence to an upstream side of the radiator 15 arc a detector 17 and a sterilizer (i.e. microorganism inhibiting unit) 18.

Coolant water discharged from the fuel cell 1 is first delivered through the detector 17 of a structure existing in the related art to detect information M related to the presence of or absence of microorganisms. Such a detecting operation is carried out in response to a command signal from the control unit 51 at predetermined time intervals. While decision of the presence of or the absence of the microorganisms present in coolant water may be executed in the detector 17 per se or may be performed in the control unit 51, in the preferred embodiment, it is arranged such that the control unit 51 performs judgment of the microorganisms based on a suspension degree of coolant water which is detected with the detector 17.

Upon receipt of judgment about the presence of the microorganisms present in coolant water, the sterilizer 18 begins to operate responsive to a command signal from the control unit 51. In particular, the sterilizer 18 is mounted inside with an ultraviolet light irradiator U, which causes ultraviolet irradiation to pass through coolant water to sterilize the microorganisms which in turn are inactivated. Here, although the word "sterilization" is in general meant to kill bacteria, in the preferred embodiment, the word "sterilization" broadly refers to killing operation of any contaminants of microorganisms such as bacteria, virus, parasites and/or fungus present in coolant water. That is, the sterilizer 18 has a function to attenuate the number of microorganisms. In the absence of judgment for the presence of the microorganisms, the control unit 51 is inoperative to actuate the ultraviolet light irradiator U for precluding electric power consumption to be caused by useless irradiation of ultraviolet light. Also, in a case where the detector 17 per se implements judgment for the presence of or the absence of the microorganisms, the detector 17 may control the sterilizer 18.

In the structure of the presently described preferred embodiment, the detector 17 and the sterilizer 18 are interposed between the fuel cell 1 and the radiator 15 in sequence starting from the upstream side of coolant water. This location is determined because of the fact that the microorganisms extensively proliferate at the temperature in a range substantially between 30 and 60° C. and an area corresponding to that temperature belongs between the fuel cell 1 and the radiator 15. With such location, it is possible to obtain the highest efficiency in sterilization of the microorganisms. Of course, however, even when the detector 17 and the sterilizer 18 are located in other area of the coolant water circulation line 35, it may be possible to obtain a similar effect in sterilization of the microorganisms in principle.

Now, the sterilization process of the fuel cell system S of the preferred embodiment is described below in detail with reference to FIG. 2, with particular attention being given to operations of the detector 17 and the sterilizer 18.

First, in step S1, it is discriminated whether a count T of a timer (not shown) contained in the detector 17 reaches a preset value α corresponding to a prescribed time interval (i.e. whether count T>preset value α). When such a time interval does not elapse (i.e. in case of "NO"), the operation goes to step S7 wherein a numeric value of 1 is added to the count T and, then, the operation goes to step S1 such that these steps are repeatedly executed until such a time interval has elapsed. Of course, judgment of such time interval may be performed with the control unit 51.

In contrast, when such time interval has elapsed (i.e. in case of "YES"), the operation goes to step S2. In step S2, detecting step for the microorganisms present in coolant water is executed by the detector 17.

In succeeding step S3, it is discriminated whether the microorganisms are detected in step S2. Upon detection of the presence of the microorganisms, the operation goes to step S4, wherein coolant water is sterilized by the sterilizer.

Subsequently, in step S5, upon receipt of the command from the control unit 51, the count T of the timer is cleared (T=0). Also, when the microorganisms are not detected in step S3, the timer is cleared in step S5.

In consecutive step S6, it is discriminated whether the operation of the coolant water circulation line 35 is to be continued or not to be continued. When it is judged that the operation is to be continued, the operation returns to step S1 to repeatedly execute the aforementioned steps. When it is judged that the operation is to be stopped, the operation is terminated.

Figure 2:
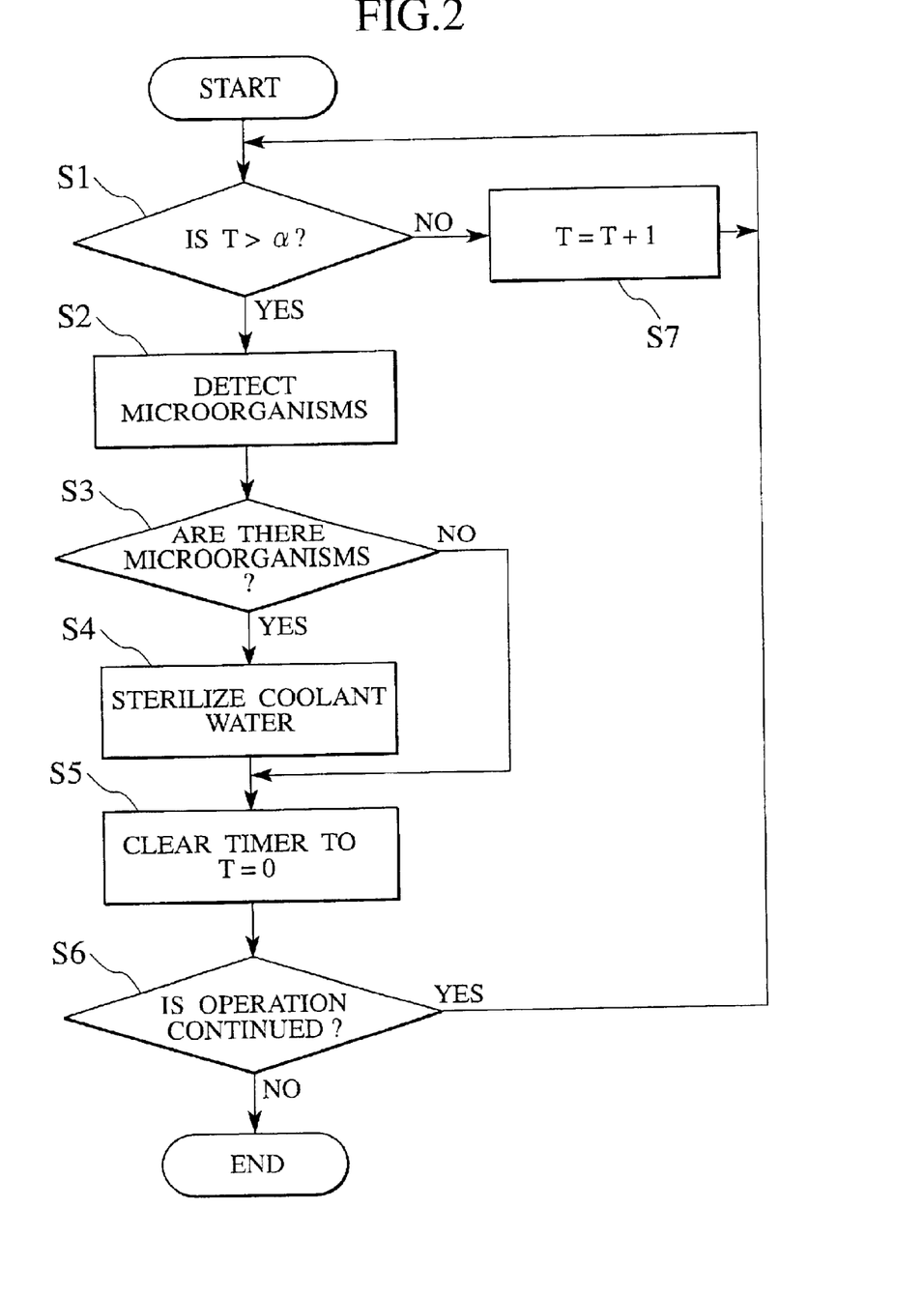
FIG. 2 is a flow chart illustrating the basic sequence of sterilizing operation of the fuel cell system shown in FIG. 1.

In the structure of the presently described preferred embodiment, as shown in the operating sequence shown in FIG. 2, sterilization of coolant water is implemented in step S4 only when it is judged in step S3 that the microorganisms are present in coolant water. As a result, it is possible to preclude waste of energy such as consumption of electric power in excess caused by sterilization that would occur when the amount of microorganisms present in coolant water remain at not so high level, thereby enabling sterilization to be efficiently performed which avoiding degraded fuel consumption.

However, even when the sterilizer 18 is provided without the detector 17 shown in FIG. 1, it is, of course, thinkable that the sterilization operation per se may be sufficiently implemented within the coolant water circulation line 35 in practical use. That is, merely mounting the sterilizer 18 in the coolant water circulation line 35, with a structure which is so constructed as to operate at all times during a time interval when the fuel cell system S is operated at a low output level, enables the sterilization to be performed in the coolant water circulation line 35. Even with such a structure, it is possible to preclude clogging in a circulation path of the coolant water circulation line 35 while preventing performances of associated component parts from being degraded, with a resultant increase in a reliability of the fuel cell system S. As a consequence, this enables the expenses required for maintenance to be remarkably reduced.

In the structure of the preferred embodiment, furthermore, the detector 17 and the sterilizer 18 are separately located to compel these component parts to execute detection of and sterilization of the microorganisms, respectively.

However, is desired, these component parts may be assembled into one piece to perform the aforementioned two functions. For example, the sterilizer 18, which has the ultraviolet light irradiator U, may be modified such that both detection and sterilization of the microorganisms are performed. Because, whichever function is executed, ultraviolet light may be possibly used. More particularly, when it is desired to detect the microorganisms, the sterilizer 18 is so settled as to detect the presence of the microorganisms by using the ultraviolet light irradiation whose magnitude is too low for sterilization but is sufficient for detection of the microorganisms whereas, when executing sterilization of the microorganisms, the magnitude of ultraviolet light is increased to reliably sterilize the microorganisms. With such a modification, electric power consumption demanded of detection is lowered, whereas during sterilization, adequate inactivation of the microorganisms is thoroughly performed.

Thus, the provision of the single unit to perform two functions enables the system to be simplified in structure with a reduction in manufacturing cost.

With the structure discussed above, further, the water coolant circulation line 35 has been shown and described as having a structure to perform sterilization of the microorganisms. But, the present invention is not limited thereto, such a structure may be applied to other line such as a moistening water circulation line.

Now, a detailed description is given to a structure wherein the microorganisms are sterilized in the moistening water circulation line.

Figure 3:
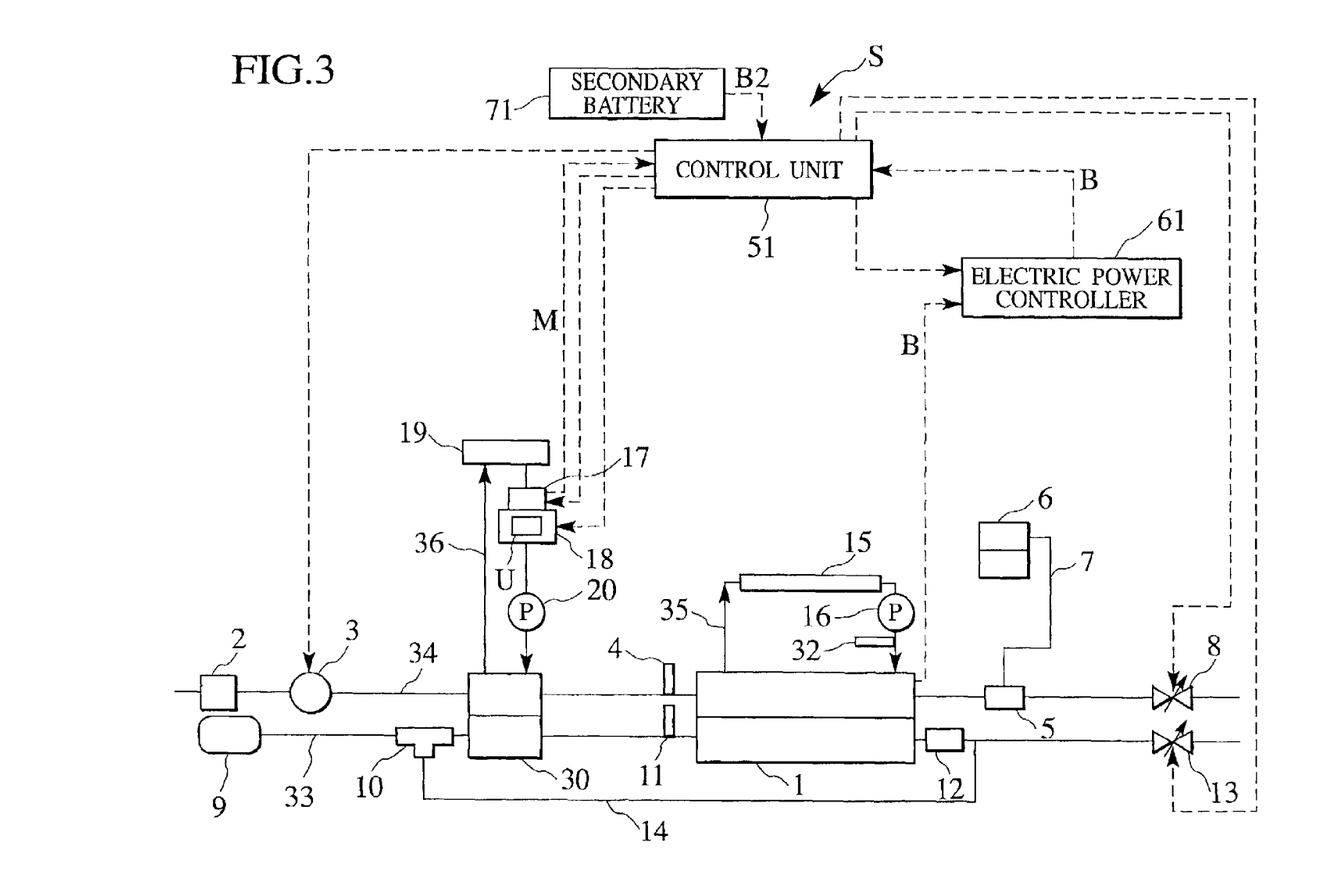
FIG. 3 is a typical structural view illustrating a second example of a fuel cell system of the first preferred embodiment according to the present invention.

FIG. 3 is a typical view illustrating a modified form of a fuel cell system S of the first preferred embodiment according to the present invention wherein sterilization of the microorganisms is executed in the moistening water circulation line 36, with like parts bearing the same reference numerals as those used in FIG. 1 to omit redundant description except for a new feature to be focused thereon.

In FIG. 3, a moistening unit 30 necesssary for moistening fuel gas and air to be supplied to the fuel cell 1 is located between the compressor 3 and the ejector 10, and the pressure sensors 4 and 11, respectively. Further, connected to the moistening unit 30 via conduits is the moistening water circulation line 36 which circulates moistening water. The moistening water circulation line 36 is composed of a heat exchanger 19 and a pump 20, by which heat exchange of moistening water and stepless adjustment of a circulation speed are realized.

With such a structure, further, the detector 17 and the sterilizer 18 are located between the heat exchanger 19 and the pump 20 in sequence from an upstream side of circulation. Thus, the presence of the detector 17 and the sterilizer 18 located in flow of moistening water directed to the pump 20 from the heat exchanger 19 enables the microorganisms, which extensively proliferate at the temperature in the range from 30 to 60° C., to be effectively sterilized in the same manner as those shown in FIG. 1. Also, while, in the modified structure shown in FIG. 3, none of the detector and the sterilizer are disposed in the coolant water circulation line 35 which has the radiator 15, the pump 16 and the pressure sensor 32 adapted to measure the inlet pressure of the coolant water side of the fuel cell 1, it is, of course, possible to locate the aforementioned units 17 and 18 in the coolant water circulation line 35 shown in FIG. 3 for thereby sterilizing coolant water.

Now, a detailed description is given to a technology about how a water stream, which is circulated in one flow path, is used both for coolant water and moistening water.

Figure 4:
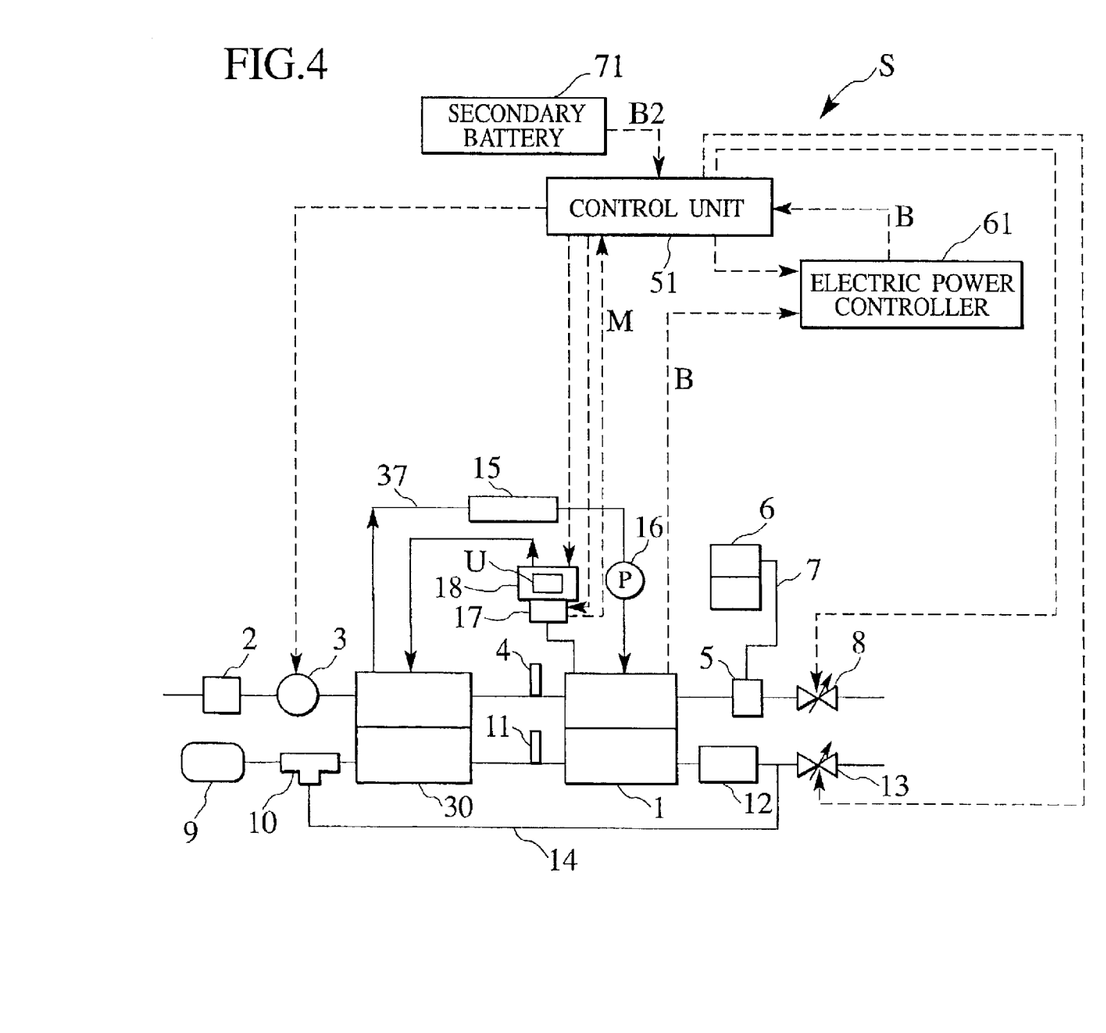
FIG. 4 is a typical structural view illustrating a third example of a fuel cell system of the first preferred embodiment according to the present invention.

FIG. 4 is a typical view illustrating a further modified form of the fuel cell system shown in FIG. 3 with the circulation lines for coolant water and moistening water being modified in structure to allow moistening water and cooling water to be circulated through the same flow path, with like parts bearing the same reference numerals as those used in FIG. 3 to omit redundant description except for a new feature which is different from that of FIG. 3.

In a modified form of the fuel cell system S shown in FIG. 4, a coolant water/moistening water circulation line 37 is comprised of the radiator 15, the pump 16, the fuel cell 1, the detector 17, the sterilizer 18 and the moistening unit 30, which form a loop circuit. Connected between the fuel cell 1 and the moistening unit 30 in the circulation line 37 are the detector 17 and the sterilizer 18 which have the same effects as those shown in FIGS. 1 and 3 to effectively sterilize the microorganisms that extensively proliferate at the temperature ranging from 30 to 60° C.

As will be understood from the foregoing description, the fuel cell systems of the preferred embodiments are comprised of the microorganism inhibiting devices which are located in either the coolant circulation line, which allows coolant fluid to be circulated for cooling the fuel cell, or the moistening water circulation line which allows moistening fluid for moistening fuel gas and oxidizing gas to be circulated, whereby the microorganisms present in the flow of fluid circulation are effectively sterilized to minimize adverse affects caused by circulation of fluid containing the microorganisms or caused to be suffered on related component parts. Thus, it is possible for obtaining a high reliability of a whole structure of the fuel cell systems.

Further, since the sterilization of the microorganisms is performed through irradiation of ultraviolet light, the fuel cell system may be simplified in structure in a practical use.

Furthermore, since the sterilization operation is initiated responsive to the detected result of the microorganisms, there are possibilities for minimizing excessive electric power consumption that would be otherwise caused by useless sterilizing operations implemented in the fuel cell system.

In addition, it is possible for the microorganism inhibiting unit to utilize ultraviolet light both for detecting and sterilizing the microorganisms, resulting in a simplified structure of the fuel cell system at a low manufacturing cost.

Also, since the sterilizing operation for the microorganisms are executed at prescribed time intervals, excess electric power consumption is minimized while inhibiting the microorganisms at regular fixed timings for thereby enhancing a high reliability in operation of the fuel cell system for a prolonged time period.

Also, the presence of the microorganism inhibiting unit located in the area remaining at the temperature most suitable for proliferation of the microorganisms among various areas of the circulation lines enables efficient sterilization of the microorganism.

(Second Preferred Embodiment)

Now, the basic sequence of operation of a fuel cell system of a second preferred embodiment is described below in detail with reference to FIGS. 5 and 6.

As previously discussed above in conjunction with steps S1 to S4 in FIG. 2, in the first preferred embodiment, the fuel cell system S has had the structure wherein the microorganisms are detected and sterilized only at the prescribed time intervals. Such a technology is more effective in minimizing excess electric power consumption than required in precluding proliferation of the microorganisms. But, in the presence of surplus power, there is no interference caused in an increase in the frequencies of detection or sterilization of the microorganisms. As a consequence, in the presently described preferred embodiment, a description will be given to a structure where the sterilizing operations are carried out at more number of frequencies than those executed in the first preferred embodiment.

Figure 5:
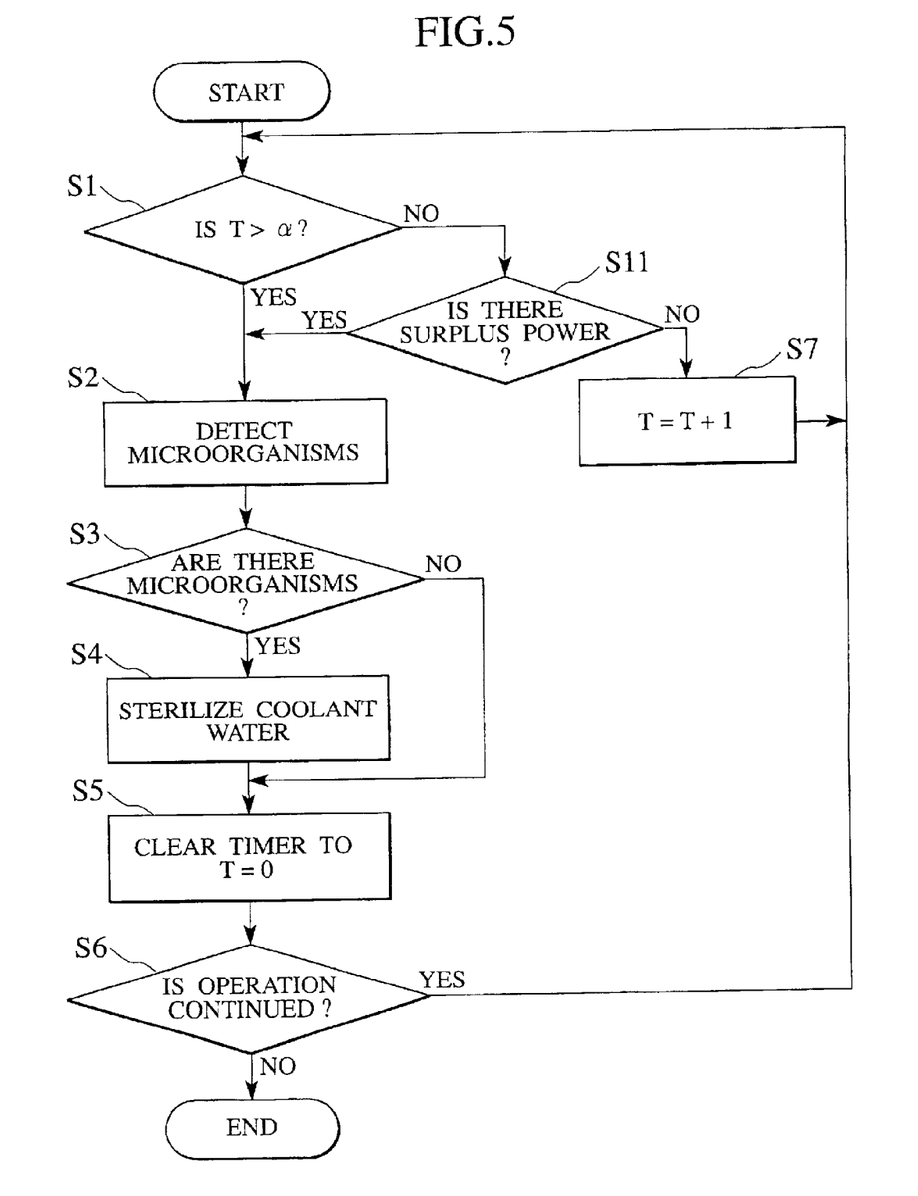
FIG. 5 is a flow chart illustrating the basic sequence of sterilizing operation of a second preferred embodiment according to the present invention.

FIG. 5 is a flow chart illustrating the basic sequence of operation of the fuel cell system of the second preferred embodiment of the present invention for determining whether to progress the sterilizing process in dependence on the presence of or the absence of surplus power. The basis sequence of FIG. 5 is fundamentally identical with that of FIG. 2 except for step S11. Such a basic sequence is described below in detail with a particular attention being given to a new feature.

In FIG. 5, if it is discriminated that the prescribed time interval has not elapsed (in case of "NO"), then, the operation goes to step S11.

Subsequently, in step S11, it is judged whether surplus power remained in the fuel cell system. Here, the word "surplus power" refers to electric power which has no interferences in function with a fundamental electric power generating operation of the fuel even when consuming electric power for sterilizing the microorganisms in the fuel cell system. For example, in a case where the fuel cell system of the present invention is applied to the vehicle, power output in excess of the fuel cell 1 produced during transition period (i.e. during a deceleration) may be treated as surplus power. Further, in a case where the secondary battery unit 71 is connected to the fuel cell system in parallel with the fuel cell 1 and has a full charge of state (which generally corresponds the SOC remaining at a value close proximity to nearly 100%), it may be possible for subsequent power output, which is not discharged and are not absorbed by the secondary battery unit 71, to be regarded as surplus power. Alternatively, in a case where the secondary battery unit 71 is located in parallel with the fuel cell 1, it may be also possible for power output, which is deemed to be charged at a practically sufficient level (i.e. in general, a level of electric power in excess of several 10% of available power output of the secondary battery unit) in view of particular load, to be regarded as surplus power.

Subsequently, if it is judged in step S11 that there is surplus power, the operation goes to step S2 even when the predetermined time interval has not elapsed and, thereafter, a series of operational steps are implemented in the same manner as described in the first preferred embodiment to perform operations such as detection of the microorganisms, etc.

In contrast, when it is judged in step S11 that there is no surplus power (in case of "NO"), the operation goes to step S7 to perform the aforementioned operation discussed in conjunction with the first preferred embodiment.

Figure 6:
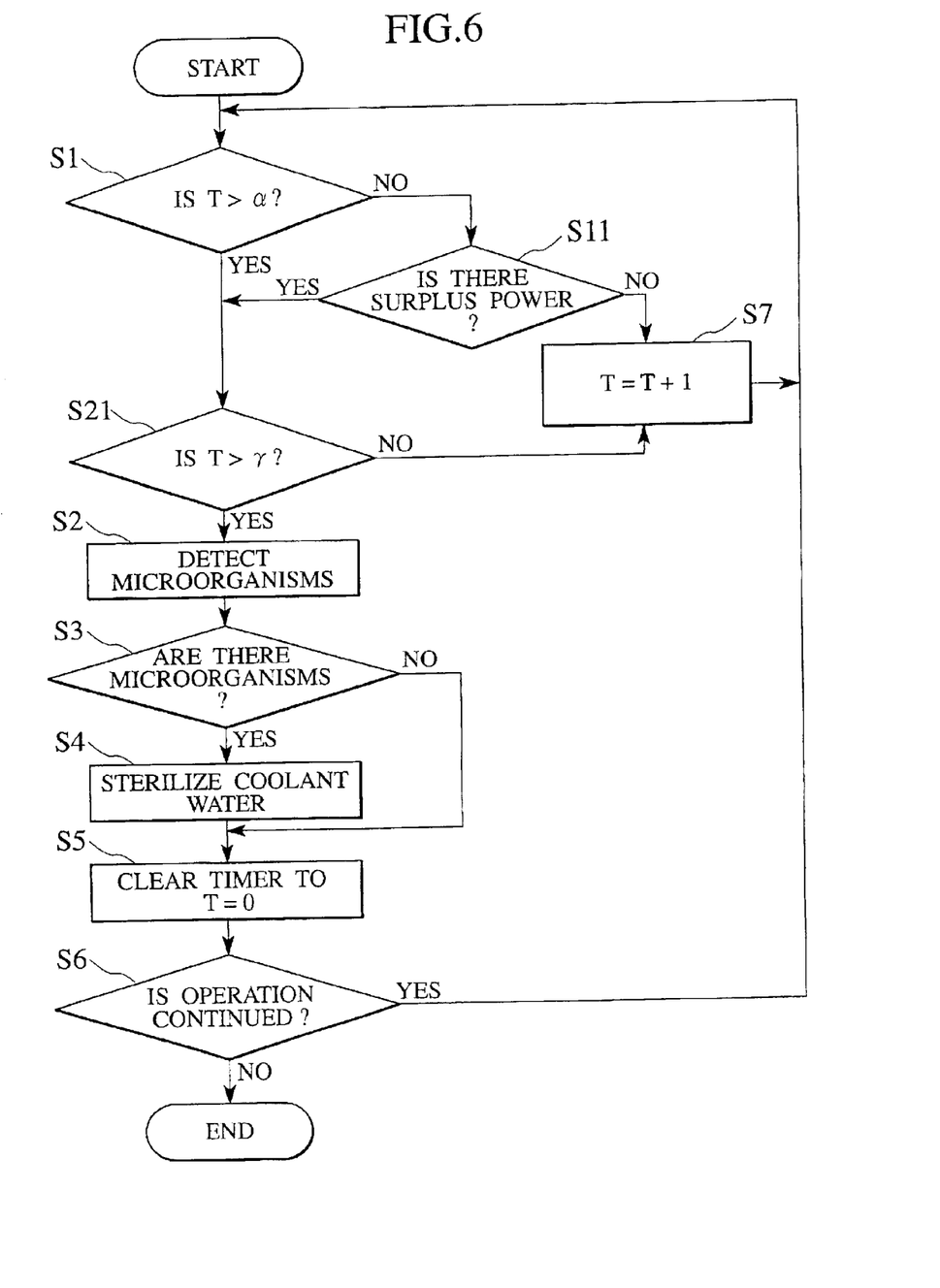
FIG. 6 is a flow chart illustrating the basic sequence of a further modified form of sterilizing operation shown in FIG. 5.

By the way, the fuel cell system of the second preferred embodiment to carry out the basic sequence of operation shown in FIGS. 5 and 6 may take not only a fundamental structure shown in FIG. 1 but also a fundamental structure shown in FIG. 3 or 4.

More particularly, a description will be given to an example wherein surplus power is determined by electric power which is not absorbed under a condition in that the secondary battery unit 71 is charged at its full capacity and, so, a subsequent charging is disabled. In this respect, the control unit 51 discriminates the presence of or the absence of surplus power in response to electric power output information B2 delivered from the secondary battery unit 71 to allow the discriminated result to cause the control unit 51 to render the detector 17 operative for detection without dependent upon the count result of the timer. If desired, such a function may be incorporated in the detector 17 per se.

Besides, as another structure where the sterilizing operations are carried out at more number of frequencies if there is the surplus power, it can be proposed to switch time intervals for carrying out a series of operational steps such as detection of the microorganisms or the like in dependence on the presence of or the absence of surplus power.

Exemplarily, two kinds of relevant time intervals are preset in the control unit 51. Thus, the control unit 51 may take the basic sequence of operations such that in the absence of surplus power, the sterilization is initiated every for relatively longer time intervals whereas in the presence of surplus power, the sterilization is initiated every for relatively shorter time intervals.

More particularly, it is possible for such a basic sequence to be carried out in a manner as to implement step S21 prior to execution of step S2 when the result in step S11 reveals "YES".

In step S21, comparison is made between the count T and a preset value γ. Here, the preset value γ takes a smaller value than the preset value α used in step S1 and, therefore, the time interval representative of the preset value γ is shorter than that of the preset value α. Subsequently, in an event in that the time interval representative of the preset value α has not elapsed and the relatively short time interval representative of the preset value γ has elapsed, the operation goes to step S2.

In contrast, when the time interval representative of the preset value γ has not elapsed, the operation goes to step S7.

With such structure, in the presence of surplus power, the detecting operation is implemented at the relatively short time intervals and the sterilization of the microorganisms is executed if desired.

Of course, the present invention is not limited to the two kinds of time intervals, and a further increased number of time intervals may be preset to allow a suitable one of the plural time intervals to be selected according to the magnitude of surplus power. With such selection of the plural time intervals, the number of frequencies of the sterilizing operation to be executed may be suitably altered, with a resultant capability of suitably controlling the amount of electric power to be consumed.

In the presently described preferred embodiment described above, when surplus power is recognized, the presence of step S11 incorporated in the system allows the operation measures for the microorganisms, involving the detecting operation (i.e. steps S2 and S3) and the sterilizing operation (i.e. step S4), to be executed at more number of frequencies than those executed in the system of the first preferred embodiment. This results in an effective control of the proliferation of the microorganisms, enabling the clogging of the circulation path caused by the microorganisms, the deterioration in the performance of various components parts and in its turn the degradation in the reliability of the fuel cell system.

(Third Preferred Embodiment)

Now, a third preferred embodiment of the present invention is described below mainly with reference to FIG. 7, with an important attention being given to a new feature added to the second preferred embodiment.

Figure 7:
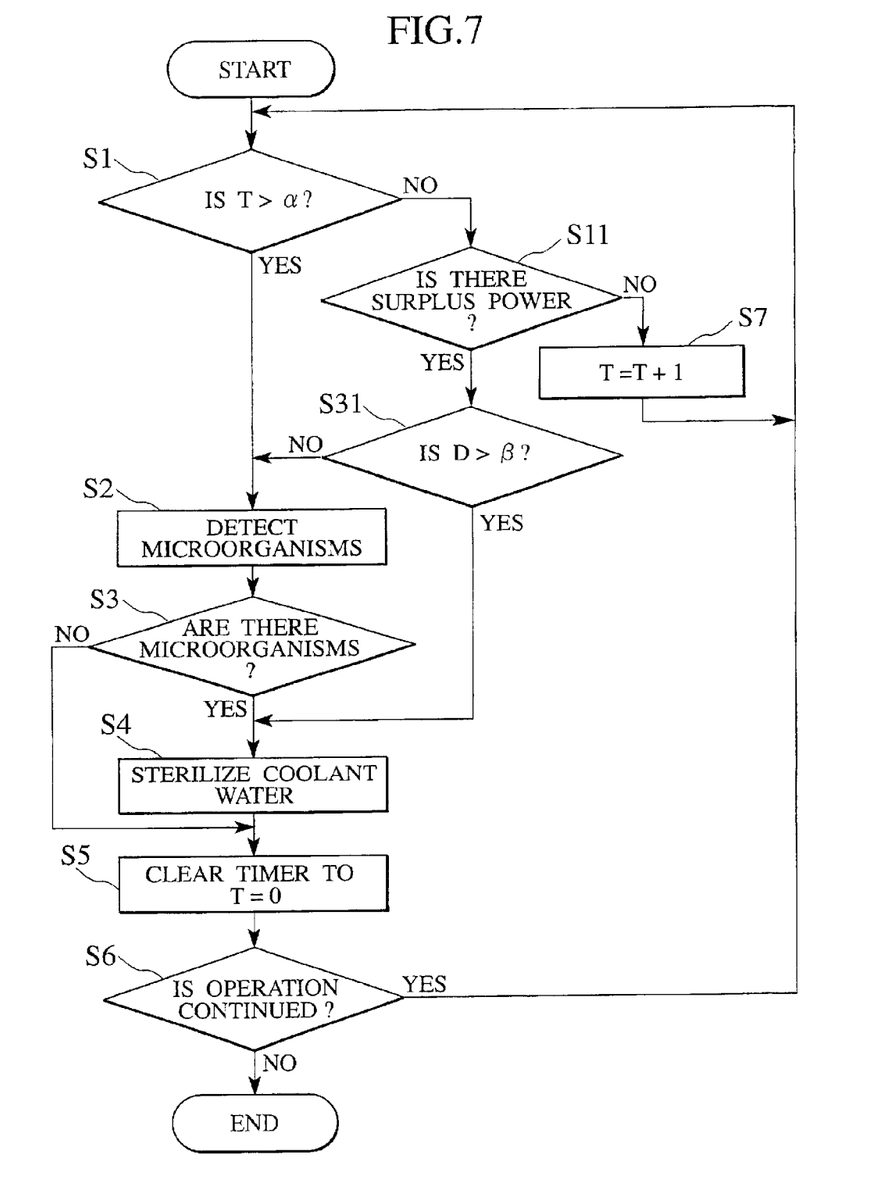
FIG. 7 is a flow chart illustrating the basic sequence of sterilizing operation of a third preferred embodiment according to the present invention.

FIG. 7 is a flow chart illustrating the basic sequence of sterilizing operation of the third preferred embodiment.

The basic sequence of FIG. 7 differs from that of FIG. 7 in that step S31 is added to step S11 in the basic sequence of operation shown in FIG. 5, with a detailed description being given in conjunction with the new feature.

In FIG. 7, when it is discriminated in step S11 that there is surplus power (in case of "YES"), the operation goes to step S31 wherein comparison is made between surplus power D, that is regarded as excess electric power in the fuel cell system, and electric power β demanded of detection and sterilization of the microorganisms. Here, surplus power D is calculated on the basis of the electric power output condition B of the fuel cell 1 and, more particularly, on the basis of electric power output produced by the fuel cell 1. Of course, in a case where the fuel cell system is applied to the vehicle, it may be possible for surplus power D to be calculated not only on the basis of electric power output of the fuel cell 1 but also on the basis of regenerative power produced during the decelerating operation of the vehicle. Also, the electric power demand β is derived from preliminarily measured results involving first minimized electric power demanded of detection of the microorganisms and second minimized electric power demanded of sterilization of the microorganisms with a view to anticipating tolerances that would otherwise occur in the fuel cell system, with the electric power demand being settled to be greater than a sum of the measured results and the tolerances by a given value and stored in the memory (not shown) of the control unit 51.

By the way, the presence of decision in step S31 wherein allowance power D is greater than electric power demand β (in case of "YES") is meant by the fact in that there is a short of need for avoidance of additional sterilizing operation to be executed by taking the trouble to implement the related steps (i.e. steps S2 and S3) for detection of the microorganisms. That is, in such a case, from a point of view for reducing load of the secondary battery unit 71 that is supposed to be charged to the nearly fullest level, it is preferable for allowance power to be positively consumed by implementing the sterilizing operation regardless of the presence of or the absence of the microorganisms. In the presently described preferred embodiment, when it is judged to be "YES" in step S21, the operation jumps over the detecting steps (i.e. steps S2 and S3) for the microorganisms and goes to step S4 where the sterilizing operation for coolant water is carried out using electric power demand β.

In contrast, when it is judged in step S31 that allowance power is less than electric power demand β (in case of "NO"), the operation goes to step S2 to select the operation not to execute the additional sterilizing operation using the electric power demand β such that, only when the presence of the microorganisms is detected, the operations subsequent to the microorganism detecting operations are initiated to carry out the sterilizing operation for the microorganisms using minimized electric power.

The presently described preferred embodiment may take any one of the fundamental structures not only shown in FIG. 1 but also shown in FIGS. 3 and 4. More particularly, it is possible to take a structure wherein the control unit 51 discriminates whether allowance power D is less than electric power demand β for supplying the command to the sterilizer 18 for its operation without receiving the detected result delivered from the detector 17. Alternatively, further, it is arranged such that the detector 17 per se executes such a discriminating operation for supplying the command to the sterilizer 18 for its operation without performing the detection of the microorganisms.

In the presently described preferred embodiment described above, in an event that the presence of step S31 enables the presence of excess electric power and allowance power to be recognized, the sterilizing operation (in step S4) may be carried out at desired timings without implementing the detecting operations (in steps S2 and S3). With such a process, not only the proliferation of the microorganisms can be effectively suppressed, but also allowance power can be positively consumed to preclude the secondary battery unit from being charged to an excessive level.

The entire content of a Patent Application No. TOKUGAN 2001-071560 with a filing date of Mar. 14, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
   a fuel cell;
   a fuel gas supply line supplying fuel gas to the fuel cell;
   an oxidizing gas supply line supplying oxidizing gas to the fuel cell;

a circulation line circulating fluid through at least one of the fuel cell, the fuel gas supply line and the oxidizing gas supply line, the fluid being supplied into and discharged from the at least one of the fuel cell, the fuel gas supply and the oxidizing gas supply line as circulating liquid; and a microorganism inhibiting unit located in the circulation line to execute sterilization so as to sterilize microorganisms present in the circulating liquid discharged from the at least one of the fuel cell, the fuel gas supply line and the oxidizing gas supply line to be supplied into the at least one of the fuel cell, the fuel gas supply line and the oxidizing gas supply line through the circulation line.

2. A fuel cell system according to claim 1, wherein the fluid is composed of coolant water cooling the fuel cell.

3. A fuel cell system according to claim 1, wherein the fluid is composed of moistening water moistening at least one of the fuel gas and the oxidizing gas.

4. A fuel cell system according to claim 1, wherein the microorganism inhibiting unit includes a ultraviolet light irradiation device which executes the sterilization through irradiation of ultraviolet light.

5. A fuel cell system according to claim 1, further comprising a detector detecting the microorganisms;

wherein the microorganism inhibiting unit is operative to execute the sterilization responsive to a detected result of the detector.

6. A fuel cell system according to claim 1, further comprising an ultraviolet light irradiator device irradiating ultraviolet light, wherein when the microorganism is detected by the ultraviolet light irradiated with a first power, the sterilization is executed with the ultraviolet light with a second power larger than the first power.

7. A fuel cell system according to claim 6, wherein the ultraviolet irradiator device is located in the microorganism inhibiting unit.

8. A fuel cell system according to claim 1, wherein the sterilization is executed at given time intervals.

9. A fuel cell system according to claim 1, wherein the sterilization is executed in dependence on surplus power of the fuel cell system.

10. A fuel cell system according to claim 9, wherein the sterilization in the presence of the surplus power is executed at frequencies higher than those at which the sterilization is executed in the absence of the surplus power.

11. A fuel cell system according to claim 9, further comprising a detector detecting the microorganism;

wherein the sterilization is executed in dependence on a detected result of the detector.

12. A fuel cell system according to claim 9, wherein the sterilization is executed further in dependence on allowance power of the fuel cell system.

13. A fuel cell system according to claim 12, wherein the sterilization is executed regardless of the presence of or the absence of the microorganisms.

14. A fuel cell system according to claim 2, wherein the circulation line is for the coolant water, and provided with a radiator through which the coolant water discharged from the fuel cell is supplied into the fuel cell, and the microorganism inhibiting unit is located upstream the radiator.

15. A fuel cell system according to claim 3, wherein the circulation line is for the moistening water, and provided with a heat exchanger through which the moistening water discharged from the at least one of the fuel gas supply line and the oxidizing gas supply line is supplied into the at least one of the fuel gas supply line and the oxidizing gas supply line, and the microorganism inhibiting unit is located downstream the heat exchanger.

16. A fuel cell system according to claim 6, wherein the ultraviolet light irradiator device in the presence of surplus power irradiates the ultraviolet light to detect the microorganism at time intervals shorter than those in the absence of the surplus power.

17. A fuel cell system comprising:

a fuel cell;

fuel gas supply means for supplying fuel gas to the fuel cell;

oxidizing gas supply means for supplying oxidizing gas to the fuel cell;

circulation means for circulating fluid through at least one of the fuel cell, the fuel gas supply means and the oxidizing gas supply means, the fluid being supplied into and discharged from the at least one of the fuel cell, the fuel gas supply means and the oxidizing gas supply means as circulating liquid; and microorganism inhibiting means for executing sterilization so as to sterilize microorganisms present in the circulating liquid in a midway of the circulation means.

18. A method of inhibiting microorganisms in a fuel cell system, the method comprising:

preparing a fuel cell;

preparing a gas supply line supplying fuel gas and oxidizing gas to the fuel cell;

circulating fluid through at least one of the fuel cell and the gas supply line, the fluid being supplied into and discharged from the at least one of the fuel cell and the gas supply line as circulating liquid; and sterilizing the microorganisms present in the circulating liquid in a midway through which the circulating liquid is circulated.

* * * * *